United States Patent [19]

Nakamura et al.

[11] Patent Number: 5,332,607
[45] Date of Patent: Jul. 26, 1994

[54] WATER-SOLUBLE DOUBLE-FACED ADHESIVE TAPE FOR SPLICING

[75] Inventors: Koichi Nakamura; Hiroshi Wada; Naoki Matsuoka, all of Osaka, Japan

[73] Assignee: Nitto Denko Corporation, Osaka, Japan

[21] Appl. No.: 15,577

[22] Filed: Feb. 10, 1993

[30] Foreign Application Priority Data

Feb. 10, 1992 [JP] Japan .................................. 4-057453

[51] Int. Cl.⁵ .................................................. C09J 7/02
[52] U.S. Cl. ........................................... 428/40; 428/57; 428/58; 428/192; 428/194; 428/212; 428/214; 428/220; 428/343; 428/352; 428/354; 428/355; 428/906
[58] Field of Search ................ 428/40, 354, 343, 352, 428/906, 57, 58, 192, 194, 220, 212, 214, 355; 242/58.5, 58.1

[56] References Cited

U.S. PATENT DOCUMENTS

| | | | |
|---|---|---|---|
| 2,387,593 | 10/1945 | Lesser | 117/68.5 |
| 3,441,430 | 4/1969 | Peterson | 428/354 |
| 4,328,269 | 5/1982 | Korpman | 428/40 |
| 5,098,786 | 3/1992 | Hanke | 428/354 |

FOREIGN PATENT DOCUMENTS

| | | |
|---|---|---|
| 0352442 | 1/1990 | European Pat. Off. . |
| 2736191 | 2/1979 | Fed. Rep. of Germany . |
| 162685 | 9/1983 | Japan . |
| 510103 | 8/1971 | Switzerland . |

Primary Examiner—Ellis P. Robinson
Assistant Examiner—Nasser Ahmad
Attorney, Agent, or Firm—Sughrue, Mion, Zinn, Macpeak & Seas

[57] ABSTRACT

A water-soluble double-faced adhesive tape is provided which needs no release paper, permits web splicing without an increase in thickness at the spliced part, and permits spliced webs to run smoothly in a papermaking process, eliminating the possibility of web breaking. The tape includes a water-disintegratable substrate, a first water-soluble adhesive layer formed on one side of the substrate from one edge of the substrate, and a second water-soluble adhesive layer formed on the other side of the substrate from the other edge of the substrate, the two adhesive layers being positioned a distance apart greater than the web thickness plus twice the tape thickness plus an allowance such that they do not overlap in the width direction, with release layers preventing the adhesive layer from sticking to the substrate when the tape is wound up into a roll.

1 Claim, 1 Drawing Sheet

WATER-SOLUBLE DOUBLE-FACED ADHESIVE TAPE FOR SPLICING

BACKGROUND OF THE INVENTION

1. Field of the Invention

The present invention relates to a water-soluble double-faced adhesive tape which is used for splicing paper etc. in paper mills and printshops.

2. Description of the Prior Art

The splicing of roll paper in paper mills and printshops has conventionally been accomplished by the aid of ordinary water-soluble double-faced adhesive tape which consists of a substrate, adhesive layers covering entirely both sides of the substrate, and release paper covering the adhesive layers. This adhesive tape suffers the disadvantage of requiring the operator to peel the release paper from it before its use. Peeling is troublesome, and the release paper is often broken during peeling, particularly in the case of splicing wide webs. Moreover, peeled release paper has to be disposed of as a bulky waste material.

Since paper webs undergo surface treatment (such as clay coating) by a knife coater or supercalendering for finishing in paper mills to make a thickness of paper even, their splicing in the conventional manner (as shown in FIG. 3) poses a problem associated with web feeding. That is, the spliced part is too thick to pass smoothly at a high speed through the gap of the knife coater or calender roll which is adjusted to the thickness of a single web. There often occurs breakage at the spliced part. Therefore, the conventional overlap splicing is unfavorable particularly for thick webs.

For reasons mentioned above, it has been believed that the double-faced adhesive tape for splicing webs in paper mills should be as thin as possible. However, there is a certain limit to reducing the thickness of the adhesive layer while maintaining an adhesive force for practical use.

SUMMARY OF THE INVENTION

The present invention was completed to solve the above-mentioned problem involved in the prior art technology. It is an object of the present invention to provide a water-soluble double-faced adhesive tape of great practical use, which, owing to its special structure, needs no release paper and permits splicing with a greatly reduced thickness.

The present invention is embodied in a water-soluble double-faced adhesive tape for splicing which comprises a water-disintegratable substrate, a first water-soluble adhesive layer formed on one side of said substrate in a proper width from one edge of said substrate, and a second water-soluble adhesive layer formed on the other side of said substrate in a proper width from the other edge of said substrate, said two adhesive layers being positioned a proper distance apart such that they do not overlap in the width direction, each adhesive layer being covered with a protective release layer which prevents the adhesive layer from sticking to the substrate when the tape is wound up into a roll.

The water-soluble double-faced adhesive tape of the present invention needs no conventional release paper and permits web splicing without an increase in thickness at the spliced part. Therefore, it permits spliced webs to run smoothly in the papermaking process, eliminating the possibility of webs breaking.

DETAILED DESCRIPTION OF THE INVENTION

An embodiment of the present invention is explained with reference to the accompanying drawing.

Figure 1:
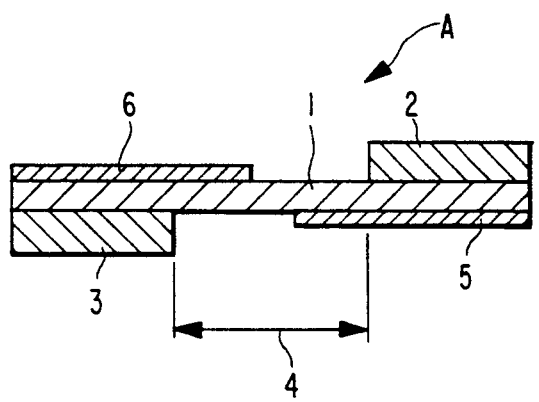
FIG. 1 is a sectional view of a water-soluble double-faced adhesive tape for splicing which conforms to the present invention.

FIG. 1 is a sectional view of a water-soluble double-faced adhesive tape pertaining to the present invention. The adhesive tape (A) is composed of a water-disintegratable substrate 1, a first water-soluble adhesive layer 2 formed on one side of said substrate in a proper width from one edge of said substrate, and a second water-soluble adhesive layer 3 formed on the other side of said substrate in a proper width from the other edge of said substrate. The two adhesive layers 2 and 3 are positioned a proper distance (clearance 4) apart such that the do not overlap in the width direction. The adhesive layers are covered with respective protective release layers 5 and 6 which prevent the adhesive layers 2 and 3 from sticking to the substrate when the tape is wound up into a roll.

Figure 2:
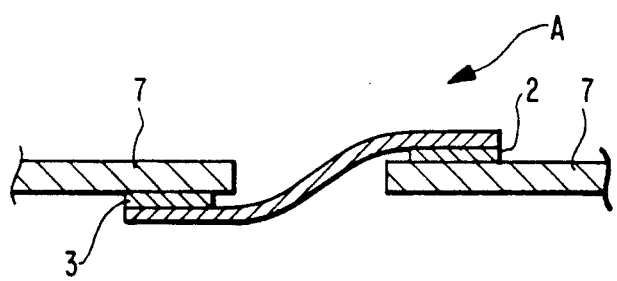
FIG. 2 is a sectional view showing how to use the water-soluble double-faced adhesive tape for splicing which conforms to the present invention.
Figure 3:
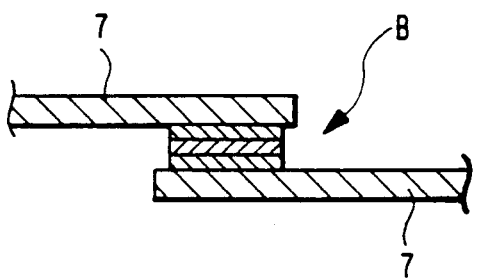
FIG. 3 is a sectional view showing how to use a conventional water-soluble double-faced adhesive tape for splicing.

FIG. 2 is a sectional view showing how to use the water-soluble double-faced adhesive tape pertaining to the present invention. To splice webs 7, the adhesive layers 2 and 3 are stuck to the respective ends of the webs. Splicing in this manner does not appreciably increase the thickness of the spliced part.

The clearance 4 between the two adhesive layers is not specifically limited so long as it is wide enough to prevent the adhesive layers from overlapping in the width direction and is greater than twice the tape thickness plus web thickness plus allowance. A greater width is efficient to handle it. It is usually 1–5 mm.

The width of the adhesive layer is not specifically limited. It is usually 5–50 mm. With an excessively narrow adhesive layer, the tape does not give sufficient adhesion strength. With an excessively wide adhesive layer, the tape is too wide to handle easily.

The thickness of the adhesive layer is not specifically limited. It is usually 20–100 um. An excessively thin adhesive layer is poor in initial adhesion strength. An excessively thick adhesive layer is squeezed out when the web is wound into a roll. This causes the adjacent web layers to stick together, resulting in web breakage.

The adhesive layer may be prepared from any water-soluble adhesive, such as the one which is formed by incorporating a polymer containing a large amount of polar groups (such as carboxyl group) with a large amount of softening agent (such as polyether polyol).

It is desirable to use in the present invention the water-soluble adhesive composition (proposed in Japanese Patent Application No. 263066/1991) which contains as essential constituents alkoxyethyl acrylate, styrene sulfonate, and a copolymer of these monomers and other monomers.

The protective release layer should be formed such that it comes into contact with the adhesive layer 2 or 3 when the tape is wound into a roll. It is usually 0.5–1 um thick. It is made from polydimethylsiloxane, for example.

The substrate is usually 70–80 um thick. The material of the substrate is not specifically limited so long as it is water-disintegratable. An example of such material is glassine paper.

What is claimed is:

1. A water-soluble double-faced adhesive tape for splicing which comprises a water-disintegratable substrate, a first water-soluble adhesive layer formed on one side of said substrate in a 5–50 mm width from one edge of said substrate, and a second water-soluble adhesive layer formed on the other side of said substrate in a 5–50 mm width from the other edge of said substrate, said two adhesive layers being positioned a distance apart greater than the web thickness plus twice the tape thickness plus an allowance such that they do not overlap in the width direction, each adhesive layer having a thickness of 20–100 $\mu$m, with a protective release layer being present on a non-adhesive surface of each side of the substrate at a location to prevent an adhesive layer from sticking to the substrate when the tape is wound up into a roll without needing any release paper for protecting the adhesive surface.

* * * * *